(12) United States Patent
McKinsey et al.

(10) Patent No.: US 6,478,272 B1
(45) Date of Patent: Nov. 12, 2002

(54) PORTABLE FOLDING HANGER

(75) Inventors: Michael B. McKinsey, Belton; Thomas Earl Maybin, Anderson, both of SC (US)

(73) Assignee: Jordan Outdoor Enterprises Ltd, Columbus, GA (US)

( * ) Notice: Subject to any disclaimer, the term of this patent is extended or adjusted under 35 U.S.C. 154(b) by 0 days.

(21) Appl. No.: 09/697,041

(22) Filed: Oct. 26, 2000

(51) Int. Cl.$^7$ ................................................ A47B 96/06
(52) U.S. Cl. ................................ 248/216.1; 248/278.1; 248/217.4; 248/282.1; 248/219.4
(58) Field of Search ........................... 248/216.1, 216.4, 248/217.2, 217.3, 217.4, 218.4, 219.1, 276.1, 278.1, 281.11, 282.1, 301, 308, 177.1, 178.1, 184.1, 187.1, 176.3

(56) References Cited

U.S. PATENT DOCUMENTS

| | | | | |
|---|---|---|---|---|
| 818,982 A | * | 4/1906 | Skelley | 379/454 |
| 1,063,220 A | * | 6/1913 | Seamon | 248/278.1 |
| 1,582,381 A | * | 4/1926 | Citero | 248/217.4 |
| 1,733,107 A | * | 10/1929 | Ahlberg | 108/137 |
| 3,601,598 A | * | 8/1971 | Horn | 362/418 |
| 3,776,498 A | * | 12/1973 | Peters et al. | 248/219.1 |
| 4,562,987 A | * | 1/1986 | Leeds et al. | 248/278.1 |
| 5,263,675 A | * | 11/1993 | Roberts et al. | 248/219.4 |
| 5,304,091 A | * | 4/1994 | Wilkinson | 452/192 |
| 5,379,205 A | * | 1/1995 | Peng | 362/430 |
| 5,518,083 A | * | 5/1996 | Blennert | 182/188 |
| 5,626,322 A | * | 5/1997 | Braun | 248/282.1 |
| 5,769,372 A | * | 6/1998 | Klosterman | 248/219.4 |
| 5,857,651 A | * | 1/1999 | Kunevicius | 248/230.8 |
| 5,865,410 A | * | 2/1999 | Horen | 248/242 |
| 6,059,240 A | * | 5/2000 | Gorsuch | 248/219.4 |

OTHER PUBLICATIONS

Illustration and description of prior art product.

* cited by examiner

Primary Examiner—Anita King
(74) Attorney, Agent, or Firm—Sutherland Asbill & Brennan LLP (57) ABSTRACT

A portable hanger, for attachment to a wood structure such as a tree, supports equipment for outdoor activity such as hunting, fishing, camping, or photography. The portable hanger comprises a rigid mounting member for attachment proximate one end to a wood structure and a swing arm pivotally connected proximate one end of the swing arm to the mounting member proximate another end of the mounting member. The swing arm extends from the one end of the swing arm to another end of the swing arm and comprises at least two rigid members pivotally connected to one another. The mounting member and the at least two rigid members of the swing arm are pivotally connected such that the portable hanger is selectively arrangeable in a compact configuration, wherein the mounting member and the at least two rigid members of the swing arm are juxtaposed, and alternatively arrangeable in an expanded configuration wherein the mounting member and the at least two rigid members of the swing arm extend end-to-end.

23 Claims, 7 Drawing Sheets

PORTABLE FOLDING HANGER

TECHNICAL FIELD

This invention relates to portable hanging devices, and more particularly, relates to equipment for outdoor activities such as hunting, fishing, camping, photography, and the like.

BACKGROUND OF THE INVENTION

Outdoor activities such as hunting, fishing, camping, photography, and the like normally involve equipment and materials which are desirably kept off the ground. Items can be hung on limbs of trees or bushes, or can be placed on top of other items such as tables, chairs, chests, and the like. To minimize the amount of equipment carried on outdoor activities, however, it is desirable to use naturally available structures such as tress. Often, though, trees in the desired area are not suitable because limbs of the trees are not in an appropriate position.

With hunting and photography in particular, it is often desirable to sit quietly for long periods of time waiting for live targets. It is also desirable to rest one's rifle, bow, or camera while waiting and then be able to steady such equipment when a target comes within range. Trees and their limbs sometimes provide a suitable structure, but other times do not.

Therefore, there is a need for a portable, lightweight and compact device for hanging or otherwise supporting equipment for outdoor activities.

SUMMARY OF THE INVENTION

This invention satisfies the above-described need by providing a portable hanger comprising three or more pivotally connected structural members which are selectively arrangeable in a compact configuration or an expanded configuration. One of the members is attachable to a wood structure such as a tree and the hanger can be expanded for appropriate positioning for hanging or steadying outdoor activity equipment such as a gun, bow, camera, or the like.

More particularly, this invention encompasses a portable hanger comprising a mounting member for attachment proximate one end of the mounting member to a wood structure and a swing arm pivotally connected proximate one end of the swing arm to the mounting member proximate another end of the mounting member. The swing arm extends from the one end of the swing arm to another end of the swing arm and comprises at least two rigid members pivotally connected to one another. The mounting member and the at least two rigid members of the swing arm are pivotally connected such that the portable hanger is selectively arrangeable in a compact configuration, wherein the mounting member and the at least two rigid members of the swing arm are juxtaposed, and alternatively arrangeable in an expanded configuration wherein the mounting member and the at least two rigid members of the swing arm extend end-to-end. Therefore, the portable hanger can be arranged in the compact configuration while carrying the portable hanger and then can be expanded for attachment to a wood structure, such as a tree, and arranged into a desirable position for a selected outdoor activity.

A suitable mounting tool is a screw which desirably extends form the one end of the mounting member. The screw can be permanently mounted to the one end of the mounting member or can be attached separately on site. When the screw is permanently mounted to the one end of the mounting member, the portable hanger can be arranged in an S-shaped configuration for enhanced leverage in boring the portable hanger into a tree or other wood structure. After the portable hanger is securely mounted to the tree or other wood structure, the swing arm can be pivoted into the appropriate configuration for the selected outdoor activity.

By having at least three members, the portable hanger can be expanded significantly in length from its compact configuration and is arrangeable in a wide variety of positions. This particularly desirable in outdoor activities such as hunting and photography wherein a full range of motion is beneficial for successful shooting. A portable hanger can be equipped with a variety of structures for hanging or otherwise supporting equipment. One suitable structure is a finger which extends radially from a longitudinal axis of the extension member proximate another end of the extension member so that when items are hung on the extension member, the finger stops the item from sliding off the hanger. Other suitable structures for supporting outdoor activity equipment are various types of platforms such as a gun mount or a camera mount.

According to one embodiment of this invention, the at least two rigid members of the swing arm comprise a connecting member and an extension member, the connecting member is pivotally connected proximate one end of the connecting member to the mounting member proximate the other end of the mounting member, and the extension member is pivotally connected proximate one end of the extension member to the connecting member proximate another end of the connecting member. The mounting member, the connecting member, and the extension member are pivotally connected such that the portable hanger is selectively arrangeable in the compact configuration, wherein the mounting member, the connecting member, and the extension member are juxtaposed, and alternatively, arrangeable in the expanded configuration wherein the mounting member, the connecting member, and the extension member extend end-to-end.

According to another embodiment of this invention, the mounting member of the portable hanger comprises an upright for attachment to the wood structure, a beam pivotally connected proximate one end to the upright proximate one end of the upright, and a leveling bar pivotally connected proximate one end to the upright at a location spaced from the one end of the upright and releasably attachable proximate another end to the beam at different positions along the length of the beam. With this embodiment, the hanger can be leveled, to account for varying tree angles. The leveling bar can be attached along the length of the beam at different positions to set the mounting member of the hanger at a desired angle relative to the upright.

This invention further encompasses a method for holding an item above the ground comprising mounting a portable hanger to a wood structure and supporting the item on the portable hanger. The portable hanger is the portable hanger of this invention described hereinabove.

Other objects, features, and advantages of this invention will become from the following detailed description of embodiments, drawings, and claims.

BACKGROUND OF THE INVENTION

FIG. 7 is a side elevation view of a portable hanger made according to an alternative embodiment of this invention. The hanger is illustrated in an expanded configuration.

DETAILED DESCRIPTION OF EMBODIMENTS

As summarized above, this invention encompasses a portable hanger for hanging or otherwise supporting equipment for outdoor activities such as hunting, fishing, camping, photography and the like. The hanger of this invention is arrangeable in a compact configuration for transport and is lightweight. In the outdoors, at a suitable site, the hanger of this invention can be arranged in a configuration for enhancing leverage and is attachable directly to a tree with a screw. The hanger of this invention is arrangeable in an expanded configuration after attachment to a wood structure such as a tree for hanging or otherwise supporting equipment.

Figure 1:
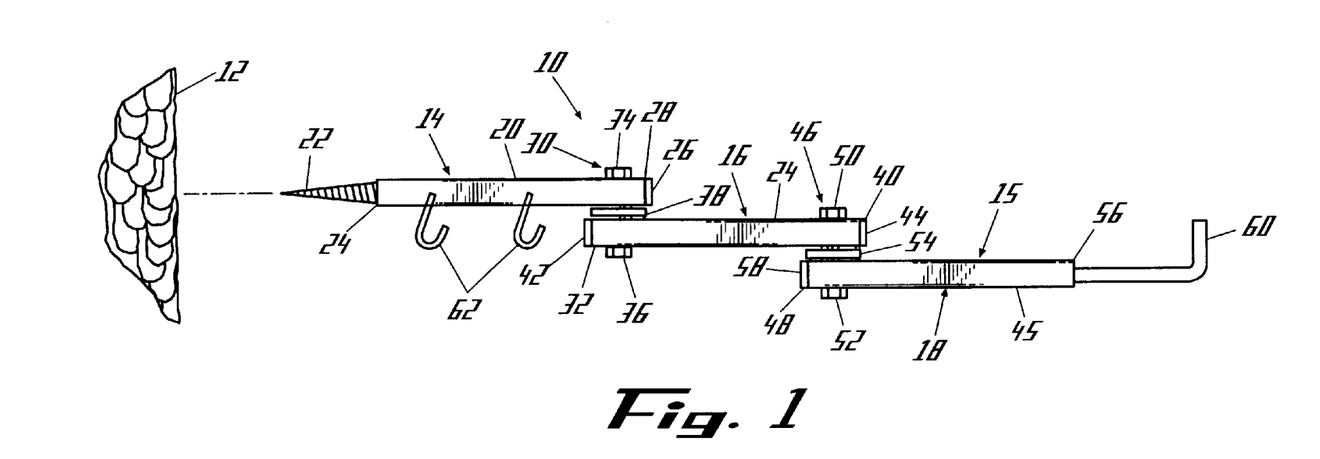
FIG. 1 is a side elevation view of a portable hanger made according to an embodiment of this invention in an expanded configuration.
Figure 2:
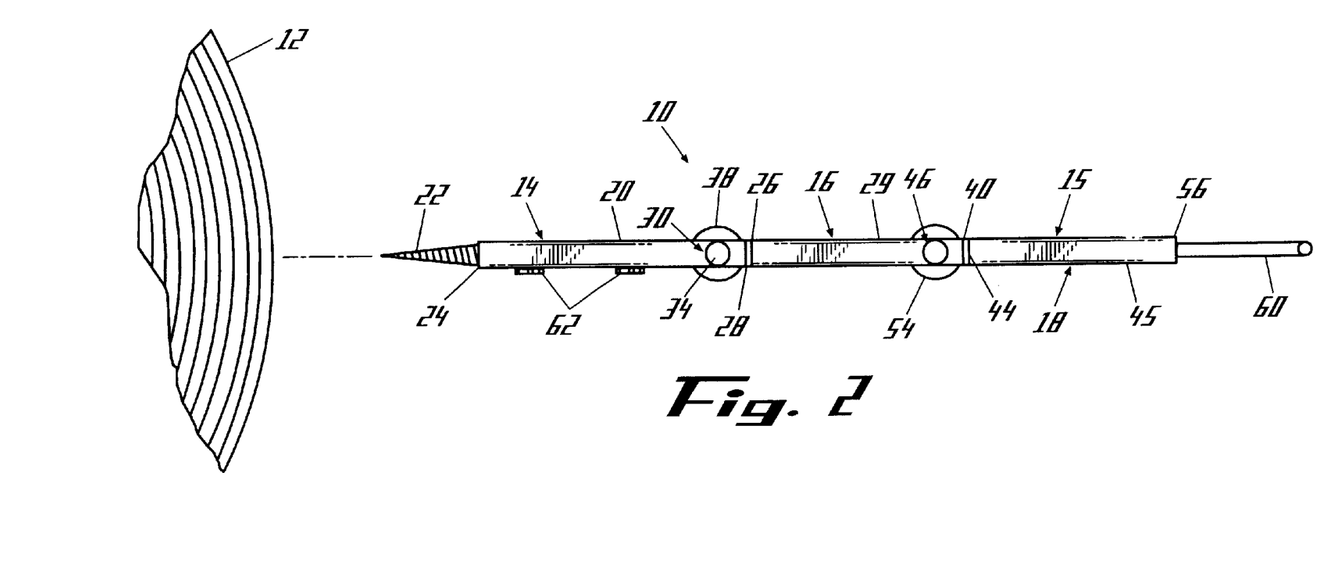
FIG. 2 is a plan view of the hanger in FIG. 1 shown in the expanded configuration.
Figure 3:
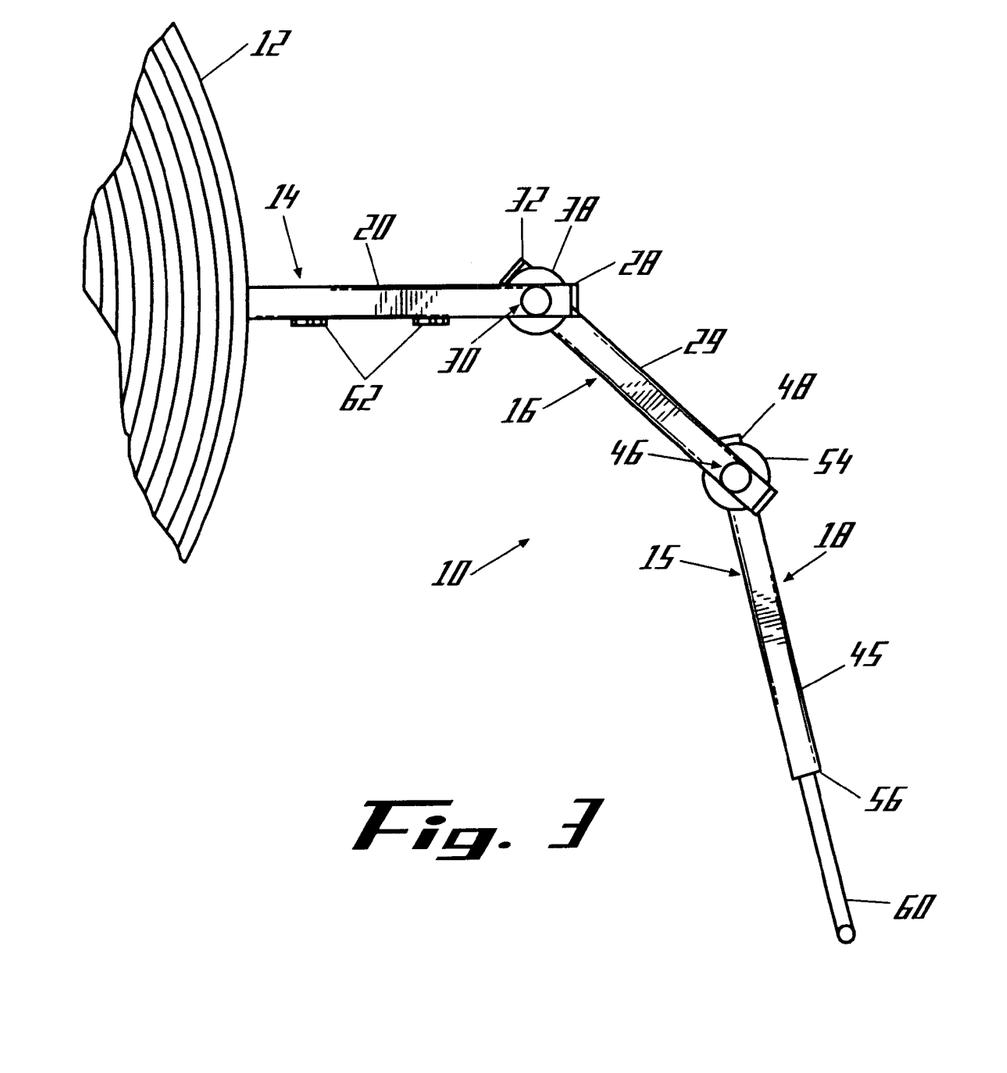
FIG. 3 is a plan view of the hanger in FIG. 1 mounted in a tree in an expanded configuration.
Figure 4:
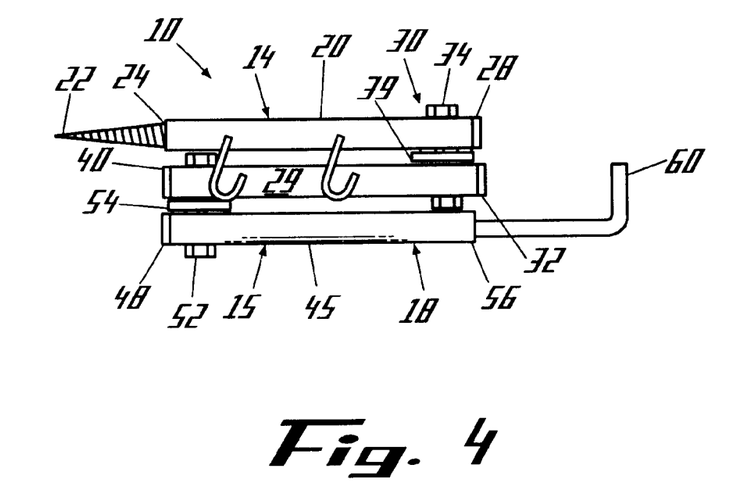
FIG. 4 is a side elevation view of the hanger in FIG. 1 arranged in a compact configuration.

Turning to the accompanying drawings in which like reference numerals indicate like parts throughout the views, a portable hanger 10 is illustrated in FIGS. 1–6. The portable hanger 10 is attachable to a wood structure such as a tree 12 and generally comprises a mounting member 14 and a swing arm pivotally connected to the mounting member. The swing arm 15 comprises a connecting member 16 and an extension member 18. As will be explained in more detail below, the mounting member 14, the connecting member 16, and the extension member 18 are pivotally connected to one another so that the portable hanger is selectively arrangeable in a compact configuration, as illustrated in FIG. 4, wherein the mounting member, the connecting member, and the extension member are juxtaposed, and alternatively arrangeable in an expanded configuration as illustrated in FIG. 3, wherein the mounting member, the connecting member, and the extension member extend end-to-end away from the tree 12 for supporting equipment.

The mounting member 14, the connecting member 16, and the extension member 18 are rigid bars. Suitable materials for making the mounting member 14, the connecting member 16, and the extension member 18 are rigid material such as metal, plastic, fiberglass, and the like. Steel and aluminum tubing are particularly suitable.

The mounting member 14 comprises a rigid bar 20 and a wood boring screw 22 extending from one end 24 of the bar. The mounting member bar 20 extends from the one end 24 to a cap 26 fitted to another end 28 of the mounting member 14.

The connecting member 16 also comprises a rigid bar 29 and a pivot 30 connects the mounting member 14 proximate the other end 28 of the mounting member to the connecting member at one end 32 of the connecting member. The pivot 30 comprises a bolt 34 extending through passages in the other end 28 at the mounting member 14 and the one end 32 of the connecting member 16, a nut 36 for tightening the bolt, and one or more washers 38 between the respective ends of the mounting member and connecting member. The connecting member bar 29 extends from the one end 32 of the connecting member 16 to another end 40 of the connecting member. Caps 42 and 44 seal the ends 32 and 40 of the connecting member 16.

The extension member 18 also comprises a rigid bar 45 and includes a pivot 46 for mounting the extension member proximate one end 48 of the extension member to the connecting member 16 proximate the other end 40 of the connecting member. The pivot 46 connecting the extension member 18 to the connecting member 16 also comprises a bolt 50 extending through passages in the extension member and connecting member, a nut 52 for tightening the bolt, and one or more washers 54 between the extension member 18 and the connecting member. The extension member extends from the one end 48 of the extension member to another end 56. An end cap 58 covers the one end 48 of the extension member 18 and a finger 60 extends outwardly and radially from a longitudinal axis of the extension member 18 for catching items hung on the extension member and preventing them from falling off. Hooks 62 attached to the mounting member 14 are suitable for hanging various items from the portable hanger.

Figure 5:
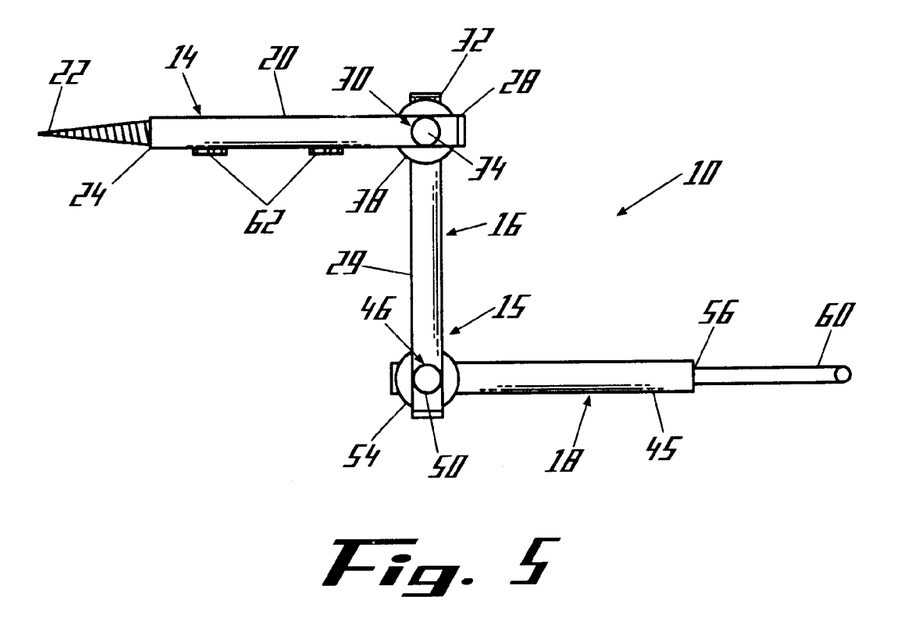
FIG. 5 is a plan view of the hanger in FIG. 1 arranged in an S-shaped configuration for attachment to a wood structure.
Figure 6:
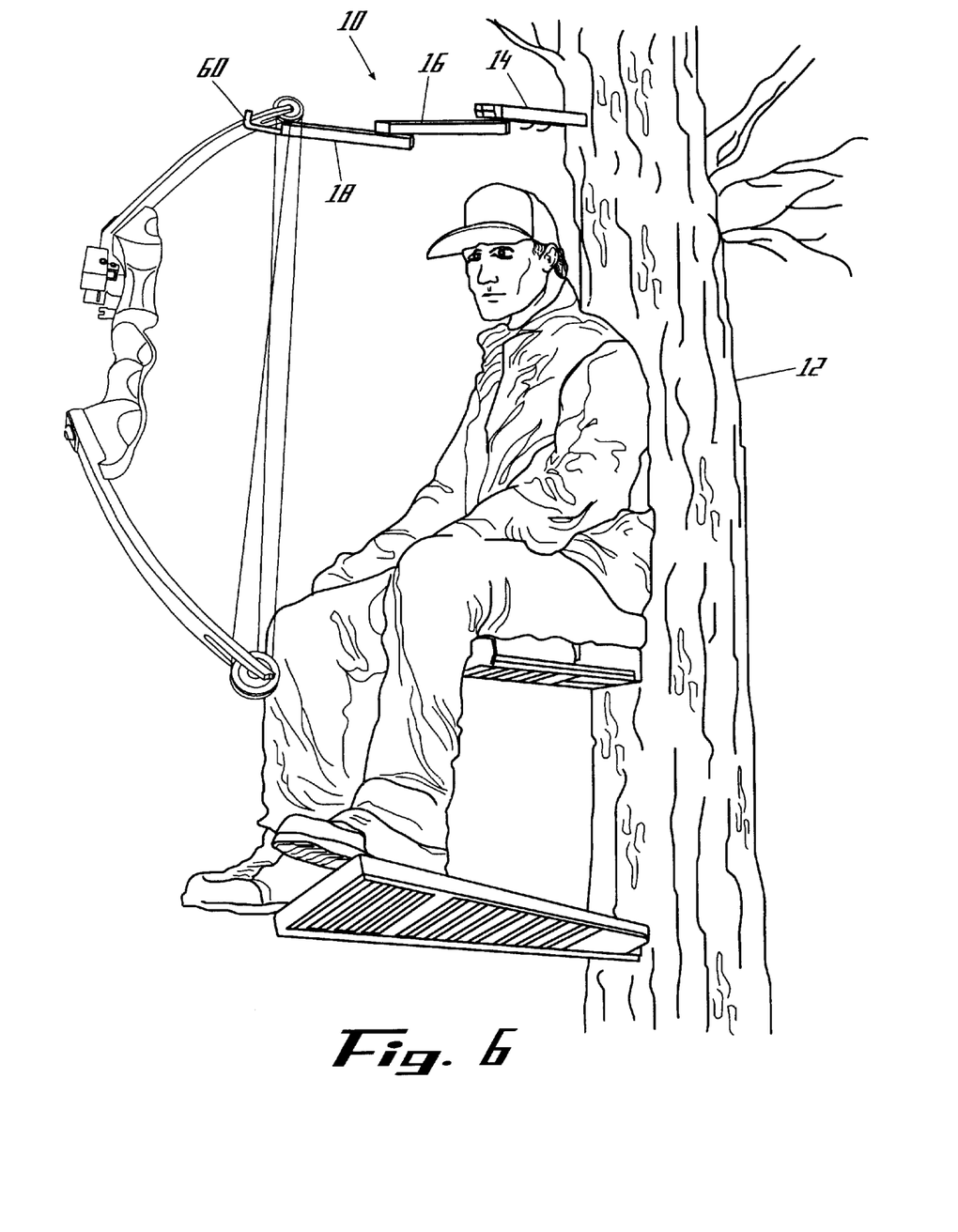
FIG. 6 is a perspective view of the hanger in FIG. 1 wherein the hanger is attached to a tree and is being used by a bow hunter.

The portable hanger 10 is desirably coated with a rust preventing paint to protect the hanger from the outdoor elements. Furthermore, the finger 60 can be coated with a slip resistant coating such as an elastomer coating. The portable hanger 10 can be folded into a compact configuration illustrated in FIG. 4 for transport. In this compact configuration, the mounting member 14, the connecting member 16, and the extension member 18 are juxtaposed to one another to minimize the size of the portable hanger. When the user arrives at a suitable site for outdoor activity, the user unfolds the portable hanger 10 and expands the portable hanger until the portable hanger has an S-shaped configuration as illustrated in FIG. 5. With one hand on the mounting member 14 and one hand on the extension member 18, the user can bore the screw 22 of the mounting member 14 into a tree using leverage provided by the extension member 18 which is radially offset from the mounting member 14. After the portable hanger 10 is securely bored into the tree 12, the connecting member 16 and extension member ca be pivoted about their respective pivots 30 and 46 until the portable hanger achieves a desirable position for hanging or supporting the user's outdoor activity equipment such as a bow or bag or the like. When the outdoor activity is finished, the user can unscrew the portable hanger 10 from the tree by returning the portable hanger 10 to the S-shaped configuration illustrated in FIG. 5 and reversing the direction of rotation.

Although the portable hanger 10 is shown having a finger 60 on the end of the extension member, the portable foldable hanger can also be equipped with other structures for hanging or otherwise resting equipment such as hooks or platforms. Suitable platforms include camera mounts and gun mounts. These items are illustrated in more detail in the embodiments described below.

FIGS. 7–10 illustrate a heavy-duty portable hanger 100 made according to another embodiment of this invention.

Figures 8, 9:
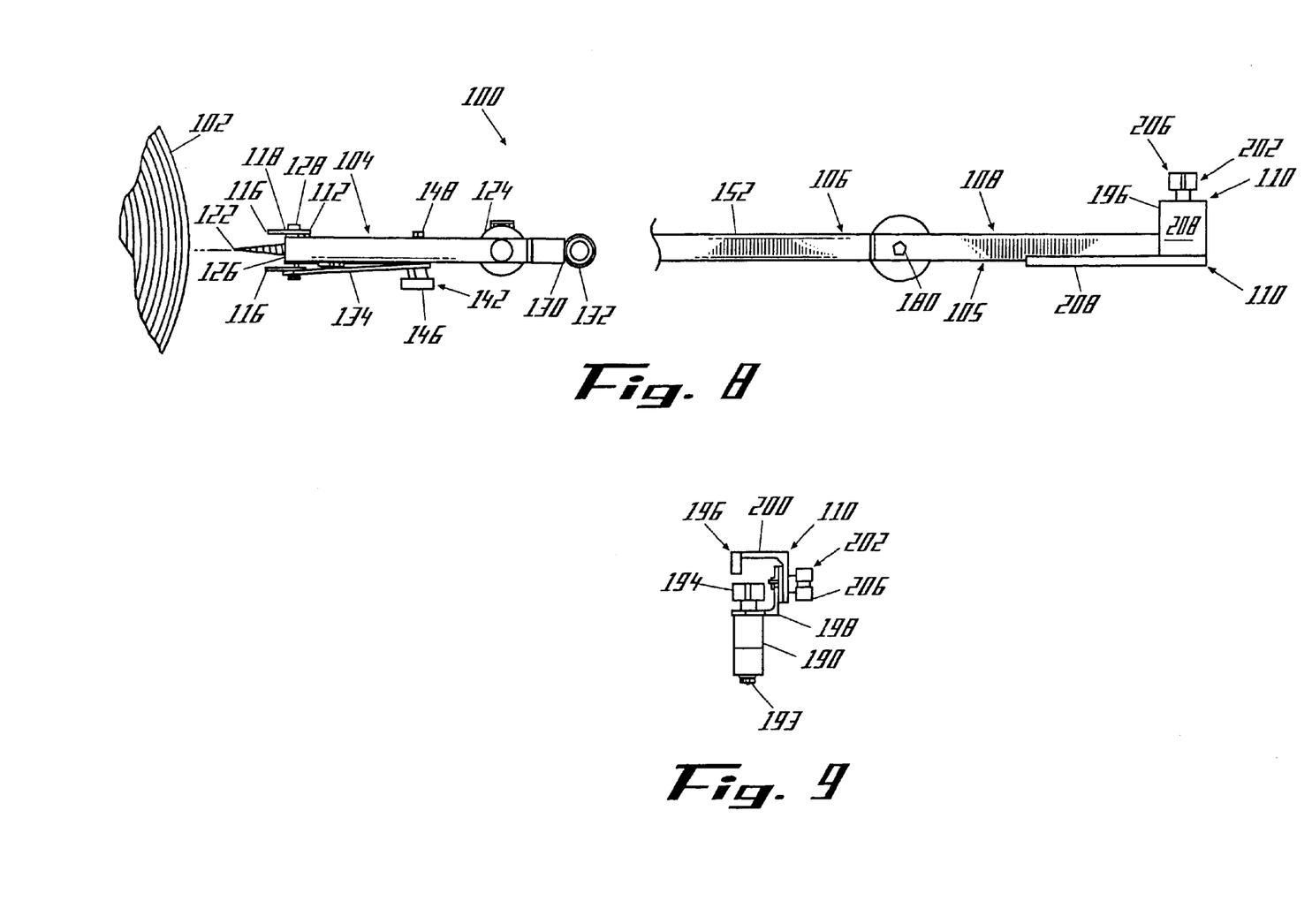
FIG. 8 is a plan view of the hanger in FIG. 7 as arranged in an expanded configuration.
FIG. 9 is a side elevation view of a camera mount for use with the hanger illustrated in FIG. 7.

This portable hanger 100 is also adapted for attachment to a wood structure such as a tree 102 for hanging outdoor sporting activity equipment. The heavy-duty portable hanger comprises a mounting member 104 and a swing arm 105 for releasable pivotable connection to the mounting member. The swing arm 105 comprises a connecting member 106 and an extension member 108 pivotally connected to one another.

The mounting member 104, the connecting member 106, and the extension member 108 are desirably made of a rigid material such as plastic, fiberglass or metal. Again, steel and aluminum tubing are particularly suitable materials.

As with the previously described embodiment, the mounting member 104, connecting member 106, and extension member 108 are pivotally connected such that the portable hanger 100 is selectively arrangeable in a compact configuration, wherein the mounting member, the connecting member, and the extension member are juxtaposed, and alternatively arrangeable in an expanded configuration wherein the mounting member, the connecting member, and the extension member extend end-to-end. A pivoting camera mount 110 rests on the extension member 108 for supporting a camera.

Figure 10:
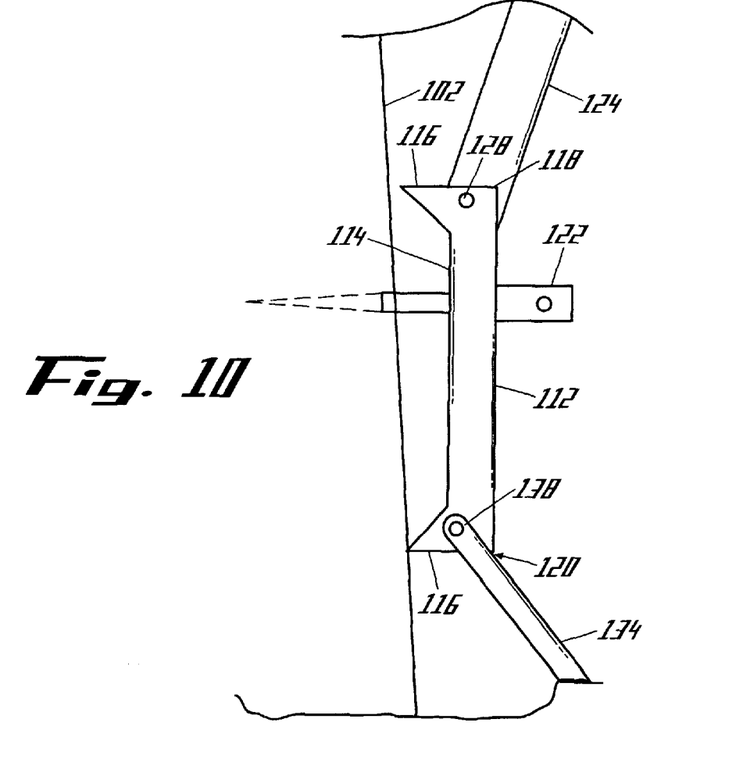
FIG. 10 is a partial side elevation view of the mounting member of the hanger illustrated in FIG. 7.

The mounting member 104 includes an upright 112 for attachment to the tree 102. The upright 112 forms a channel 114 and has teeth 116 which become embedded in the tree 102 when the upright 112 is mounted to the tree. The upright 112 extends from one end 118 to another end 120 and is attachable to the tree 102 by means such as a screw 122 or a ratchet strap.

The mounting member 104 also comprises a beam 124 which is mounted at one end 126 with a pivot 128 to the one end 118 of the upright 112. The beam 124 extends from the one end 126 to another end 120 where a cylindrical bearing 132 is welded to the beam.

A leveling bar 134 is attached at one end 136 with a pivot 138 to the other end 120 of the upright and extends to another end 140 which can be attached to the beam 124 with a selectively releasable pivot 142. The releasable pivot 142 comprises a bolt, a knob 146 attached to one end of the bolt, and a nut 148 for tightening the bolt. The bolt of the releasable pivot fits through a hole in the other end of 140 of the leveling bar 134 and can be fitted through any one of the plurality of holes 150 along the length of the beam 124. The releasable pivot 142 is engaged with the appropriate hole 150 in the beam 124 for providing the desired level or angle of the beam. The connecting member 106 comprises a rigid bar 152 such as aluminum tubing and extends from one end 154 to another end 156. The ends of the connecting member bar 152 are sealed with end caps 158 and 160. A pivot 162 extends radially from the one end 154 of the connecting member 106 and comprises a bolt 164 and nut 166 securing a sleeve or journal 168 to the one end 154 of the connecting member. The sleeve 168 is selectively engageable within a bushing disposed in the bearing 132 of the mounting member 104 so that the swing arm 105 pivots relative to the mounting member.

The extension member 108 also comprises a bar 169 such as an aluminum tube and extends from one end 170 to another end 172. End caps 174 and 176 seal the ends 170 and 172. A pivot 178 connects the one end 170 of the extension member 108 to the other end 156 of the connecting member 106. The pivot 178 comprises a bolt 180, a nut 182 for tightening the bolt, a pair of discs 184 mounted respectively to the one end 170 of the extension member 108 and the other end 156 of the connecting member 106, and one or more washers 186 fitted between the discs.

The camera mount 110 is disposed proximate the other end 172 of the extension member 108. The camera mount 110 is pivotally mounted to the extension member 108 with an arrangement comprising a bearing 190 and a bolt extending through the camera mount and bearing to a nut 193. A knob 194 is attached to the bolt 192 opposite the nut 193 for tightening the camera mount 110 to the extension member 108.

The camera mount includes a tripod head 196 comprising a base 198 mounted to the bearing 190 and a platform 200 for holding a camera. The platform 200 is mounted to the base 198 with a pivot 202 comprising a bolt and a knob 206 for tightening the bolt. An adjusting arm 208 extends from the platform 200 for manually pivoting the platform relative to the base 198 with the pivot 202. The camera mount platform 200 is therefore pivotable about a first axis which is substantially perpendicular to the length of the extension member 108 and a second axis which is substantially perpendicular to the first axis. This allows for full range of movement by a photographer for taking picture while using the hanger 100 to steady the shot.

The heavy-duty portable hanger 100 operates in a manner similar to the portable hanger 10 described earlier and illustrated in FIGS. 1-6 except that the method for mounting the heavyduty portable hanger to a tree 102 is different. To mount the heavy-duty portable hanger 100 to a tree 102, the swing arm 105 is disengaged from the mounting member 104 and the leveling bar 134 is disengaged from the beam 124 by disengaging the releasable pivot 142. The upright 112 of the mounting member 104 is then positioned vertically against the tree 102 and the screw 122 is inserted through a hole (not shown) in the upright and bored into the tree until the teeth 116 of the upright are embedded into the tree and the mounting member 104 is securely mounted into the tree. The leveing bar 134 is then pivotally engaged with the beam 124 by engaging the releasable pivot 142 with one of the boles 150 along the length of the beam. The releasable pivot 142 is engaged with the selected hole 150 along the length of the beam 124 as necessary to provide an appropriate angle between the beam and the upright. The swing arm 109 is then reengaged with the mounting member 104 by reinserting the journal 168 into the bearing 132. The foregoing process is reversed to disengage the heavy-duty portable hanger 100 from the tree.

Figure 11:
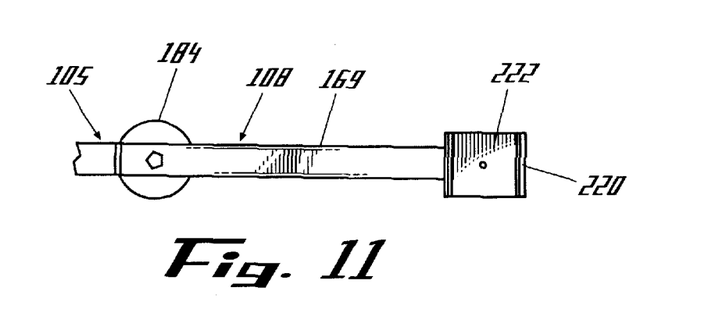
FIG. 11 is a partial side elevation view of a portable hanger such as that illustrated in FIG. 7, except with a gun mount instead of a camera mount.
Figure 12:
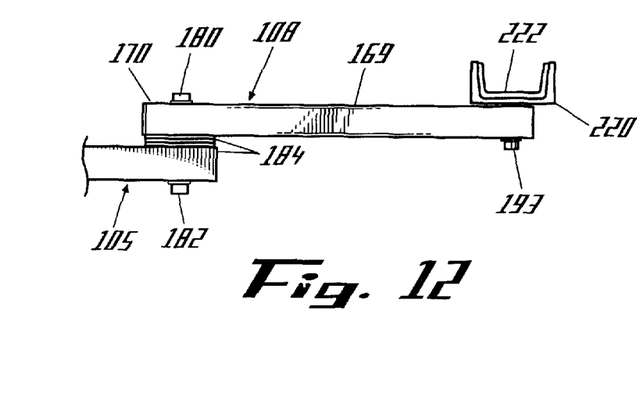
FIG. 12 is a partial plan view of the hanger illustrated in FIG. 11 with a gun mount.

Although FIGS. 7–10 illustrate the use of a camera mount with the heavy-duty portable hanger 100, the camera mount can be replaced with a variety of suitable structures such as a U-shaped gun mount, as illustrated in FIGS. 11 and 12. Desirably, the gun mount is fitted with a pad 222 to prevent scratching the gun. The gun mount 220 is desirably pivotally mounted to the extension member 108 to accommodate a wide range of movement for the user.

Although the swing arms 15 and 105 in the above-described embodiments are shown as having two rigid members connected by a pivot, this invention also encompasses embodiments wherein the swing arm comprises three or more rigid members or bars connected by pivots so that the expandability of the portable hanger can be enhanced.

We claim:
1. A portable hanger comprising:
a rigid mounting member for attachment proximate one end to a wood structure, the mounting member comprising a screw extending from the one end of the mounting member for attachment to the wood structure; and
a swing arm pivotally connected proximate one end of the swing arm to the mounting member proximate another end of the mounting member, the swing arm extending from the one end of the swing arm to another end of the swing arm and comprising at least two rigid members pivotally connected to one another, the mounting member and the at lest two rigid members of the swing arm being pivotally connected such that the portable hanger is (a) selectively arrangeable in a compact configuration, wherein the mounting member and the at least two rigid members of the swing arm are juxtaposed, (b) alternatively arrangeable in an expanded configuration wherein the mounting member and the at least two rigid members of the swing arm extend end-to-end for supporting a hanging item, and (c) also alternatively arrangeable in a mounting configuration such that a user, with one hand on the mounting member and one hand on one of the at least two rigid members of the swing arm, can bore the screw of the mounting member into the wood structure using leverage provided by the one of the at least two rigid members of the swing arm which is radially offset from the mounting member by another of the at least two rigid members of the swing arm.

2. A portable hanger as in claim 1 wherein the swing arm comprises a finger extending radially from a longitudinal axis of one of the rigid members of the swing arm proximate another end of the swing arm.

3. A portable hanger as in claim 1 further comprising a platform on the swing arm.

4. A portable hanger as in claim 3 wherein the platform is padded.

5. A portable hanger as in claim 3 wherein the platform is U-shaped.

6. A portable hanger as in claim 3 wherein the platform is pivotally mounted to the swing arm.

7. portable hanger as in claim 6 wherein the platform is pivotable about first axis and a second axis substantially perpendicular to the first axis.

8. A portable hanger as in claim 7 wherein the platform is a camera mount.

9. A portable hanger as in claim 1 wherein the mounting member and the rigid members of the swing arm are metal bars.

10. A portable hanger comprising:
a rigid mounting member for attachment proximate one end to a wood structure; and
a swing arm pivotally connected proximate one end of the swing arm to the mounting member proximate another end of the mounting member, the swing arm extending from the one end of the swing arm to another end of the swing arm and comprising at least two rigid members pivotally connected to one another,
the mounting member and the at least two rigid members of the swing arm being pivotally connected such that the portable hanger is selectively arrangeable in a compact configuration, wherein the mounting member and the at least two rigid members of the swing arm are juxtaposed, and alternatively arrangeable in an expanded configuration wherein the mounting member and the at least two rigid members of the swing arm extend end-to-end,
wherein the mounting member comprises:
an upright for attachment to the wood structure;
a beam pivotally connected proximate one end to the upright proximate one end of the upright; and
a leveling bar pivotally connected proximate one end to the upright at a location spaced from the one end of the upright and releasably attachable proximate another end to the beam at different positions along the length of the beam.

11. A portable hanger as in claim 10 wherein the upright is attachable to the wood structure with a screw.

12. A portable hanger as in claim 10 wherein the upright comprises a plurality of projections for embedding into the wood structure.

13. A portable hanger as in claim 10 wherein the swing arm has a journal proximate the one end of the swing arm and the beam has a bearing at another end of the beam for pivotally receiving the journal.

14. A portable hanger as in claim 10 further comprising a platform on the swing arm.

15. A portable hanger as in claim 14 wherein the platform is padded.

16. A portable hanger as in claim 14 wherein the platform is U-shaped.

17. A portable hanger as in claim 14 wherein the platform is pivotally mounted to the swing arm.

18. A portable hanger as in claim 17 wherein the platform is pivotable about first axis and a second axis substantially perpendicular to the first axis.

19. A portable hanger as in claim 18 wherein the platform is a camera mount.

20. A portable hanger as in claim 10 wherein the mounting member and the rigid members of the swing arm are metal bars.

21. A portable hanger comprising:
a rigid mounting member for attachment proximate one end to a wood structure, the mounting member comprising a screw extending from the one end of the mounting member for attachment to the wood structure; and
a swing arm pivotally connected proximate one end of the swing arm to the mounting member proximate another end of the mounting member, the swing arm extending from the one end of the swing arm to the another end of the swing arm and comprising at least two rigid members pivotally connected to one another,
the at least two rigid members of the swing arm comprising a connecting member and an extension member, the connecting member pivotally connected proximate one end of the connecting member to the mounting member proximate the other end of the mounting member and the extension member pivotally connected proximate one end of the extension member to the connecting member proximate another end of the connecting member,
the mounting member, the connecting member, and the extension member being pivotally connected such that the portable hanger is (a) selectively arrangeable in the compact configuration, wherein the mounting member, the connecting member, and the extension member are juxtaposed, (b) alternatively arrangeable in the expanded configuration wherein the mounting member, the connecting member, and the extension member extend end-to-end for supporting a hanging item, and (c) also alternatively arrangeable in a mounting configuration such that a user, with one hand on the mounting member and one hand on the extension member, can bore the screw of the mounting member into the wood structure using leverage provided by the extension member which is radially offset from the mounting member by the connecting member.

22. A method for holding an item above the ground comprising the steps of:

provimding a portable hanger comprising:

a rigid mounting member for attachment proximate one end of the wood structure, the mounting member comprising a screw extending from the one end of the mounting member for attachment to the wood structure; and a swing arm pivotally connected proximate one end of the swing arm to the mounting member proximate another end of the mounting member, the swing arm extending from one end of the swing arm to another end of the swing arm and comprising at least two rigid members pivotally connected to one another;

arranging the portable hanger in a mounting configuration such that one of the at least two rigid members of the swing arm is radially offset from the mounting member by another of the at least two rigid members of the swing arm;

mounting the portable hanger to the wood by placing one hand on the mounting member and one hand on the one radially offset rigid member of the swing arm, and boring the screw of the mounting member into the wood structure using leverage provided by the one radially offset rigid member of the swing arm;

expanding the portable hanger to an expanded configuration wherein the mounting member and at least two rigid members of the swing arm extend end-to-end; and supporting the item on the portable hanger.

23. A method as in claim 22 wherein the wood structure is a tree.

* * * * *